United States Patent
Baca et al.

(10) Patent No.: US 9,411,114 B2
(45) Date of Patent: Aug. 9, 2016

(54) LOOSE-TUBE FIBER OPTIC CABLES

(71) Applicant: Corning Optical Communications LLC, Hickory, NC (US)

(72) Inventors: Adra Smith Baca, Rochester, NY (US); Brandon Robert Williamson, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/739,363

(22) Filed: Jun. 15, 2015

(65) Prior Publication Data

US 2015/0370023 A1    Dec. 24, 2015

Related U.S. Application Data

(60) Provisional application No. 62/013,718, filed on Jun. 18, 2014.

(51) Int. Cl.
*G02B 6/44* (2006.01)
*C08L 23/08* (2006.01)

(52) U.S. Cl.
CPC .............. *G02B 6/441* (2013.01); *C08L 23/0815* (2013.01); *G02B 6/443* (2013.01); *G02B 6/4434* (2013.01); *G02B 6/4486* (2013.01)

(58) Field of Classification Search
None
See application file for complete search history.

(56) References Cited

U.S. PATENT DOCUMENTS

| | | | | |
|---|---|---|---|---|
| 6,041,153 A | * | 3/2000 | Yang | .................. B29C 47/0023 385/100 |
| 6,411,403 B1 | * | 6/2002 | Siddhamalli | ........... G02B 6/443 385/109 |
| 6,506,492 B1 | | 1/2003 | Foulger | |
| 7,373,057 B2 | | 5/2008 | Pizzorno et al. | |

FOREIGN PATENT DOCUMENTS

| | | |
|---|---|---|
| EP | 1489447 A1 | 12/2004 |
| JP | 2005258297 A | 9/2005 |
| WO | 2011/079457 A1 | 7/2011 |

OTHER PUBLICATIONS

"Formation of Co-continuous Structures in Melt-Mixed Immiscible Polymer Blends", Petra Potschke an D.R. Paul, Journal of Macromolecular Science, Part C , Polymer Reviews, vol. C43, No. 2, pp. 87-141, 2003.
Patent Cooperation Treaty, International Search Report and Written Opinion for PCT/US15/35754, mail date Dec. 17, 2015, 14 pages.

* cited by examiner

*Primary Examiner* — Uyen Chau N Le
*Assistant Examiner* — Chad Smith
(74) *Attorney, Agent, or Firm* — William D. Doyle

(57) ABSTRACT

According to one embodiment, loose-tube fiber optic cables may include a cable core and a jacket. The cable core may include a buffer tube and an optical fiber and the optical fiber may be positioned within the buffer tube. At least a portion of the buffer tube by include a first phase that includes a first polymer and a second phase that includes a second polymer, where the first polymer and the second polymer are different chemical compositions. The first phase and second phase may be disposed in at least a partially co-continuous microstructure.

20 Claims, 4 Drawing Sheets

LOOSE-TUBE FIBER OPTIC CABLES

PRIORITY APPLICATION

This application claims the benefit of priority under 35 U.S.C. §119 of U.S. Application 62/013,718 filed on Jun. 18, 2014, the content of which is relied upon and incorporated herein by reference in its entirety.

BACKGROUND

The disclosure relates generally to fiber optic cables and, more particularly, to loose-tube fiber optic cables and methods for the manufacture of such fiber optic cables.

No admission is made that any reference cited herein constitutes prior art. Applicant expressly reserves the right to challenge the accuracy and pertinency of any cited documents.

SUMMARY

One embodiment of the disclosure relates to loose-tube fiber optic cables comprising a cable core and a jacket. The cable core may comprise a buffer tube and an optical fiber. The optical fiber may be positioned within the buffer tube. The buffer tube may be positioned at an interior region of the loose-tube fiber optic cable. The jacket may be positioned around the cable core where the jacket defines an outer surface of the loose-tube fiber optic cable. An outer diameter of the optical fiber may be substantially less than an inner diameter of the buffer tube. At least a portion of the buffer tube may comprise a first phase comprising a first polymer and a second phase comprising a second polymer. The first polymer and the second polymer are different chemical compositions. The first phase and the second phase may be disposed in at least a partially co-continuous microstructure.

An additional embodiment of the disclosure relates to loose-tube fiber optic cables comprising a cable core and a jacket. The cable core may comprise a buffer tube and an optical fiber. The optical fiber may be positioned within the buffer tube. The buffer tube may be positioned at an interior region of the loose-tube fiber optic cable. The jacket may be positioned around the cable core where the jacket defines an outer surface of the loose-tube fiber optic cable. An outer diameter of the optical fiber may be substantially less than an inner diameter of the buffer tube. At least a portion of the buffer tube may comprise a first phase comprising at least about 70% of a first polymer and a second phase comprising at least about 70% of a second polymer. The first polymer and the second polymer are different chemical compositions. The first phase and the second phase may be disposed in at least a partially co-continuous microstructure. At least a portion of the buffer tube may have a continuity index ($\Phi_I$) of greater than or equal to about 0.5.

An additional embodiment of the disclosure relates to loose-tube fiber optic cables comprising a cable core and a jacket. The cable core may comprise a buffer tube and an optical fiber. The optical fiber may be positioned within the buffer tube. The buffer tube may be positioned at an interior region of the loose-tube fiber optic cable. The jacket may be positioned around the cable core where the jacket defines an outer surface of the loose-tube fiber optic cable. An outer diameter of the optical fiber may be substantially less than an inner diameter of the buffer tube. Substantially the entire buffer tube may comprise a first phase comprising at least about 70% of a first polymer and a second phase comprising at least about 70% of a second polymer. The first polymer and the second polymer are different chemical compositions. The first phase and the second phase may be disposed in at least a partially co-continuous microstructure.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
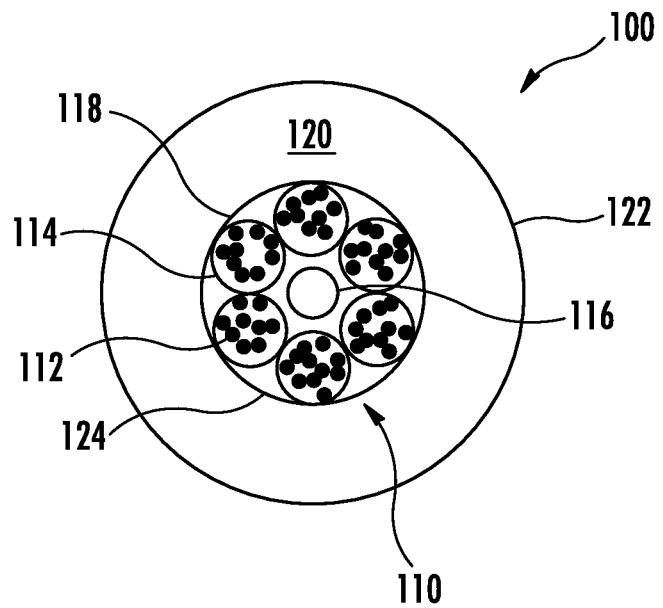
FIG. 1 schematically depicts a cross-sectional view of a loose-tube fiber optic cable, according to one or more embodiments disclosed herein.

Reference will now be made in detail to embodiments of loose-tube fiber optic cables, examples of which are illustrated in the accompanying drawings. Whenever possible, the same reference numerals will be used throughout the drawings to refer to the same or like parts. One embodiment of a loose-tube fiber optic cable is schematically depicted in FIG. 1. The loose-tube fiber optic cable generally includes at least one buffer tube, optical fibers, and a jacket. As described herein, the buffer tube may comprise two or more polymers disposed in at least a partially co-continuous microstructure. The buffer tube comprising at least a partially co-continuous microstructure may exhibit enhanced mechanical properties such as increased strength and flexibility. Various embodiments of loose-tube fiber optic cables will be described herein with specific reference to the appended drawings.

Referring to FIG. 1, a cross-sectional view of a loose-tube fiber optic cable 100 is schematically depicted. In one embodiment, the fiber optic cable 100 generally includes a cable core 110 comprising one or more optical fibers 112, one or more buffer tubes 114, one or more strength members 116, or combinations thereof. The loose-tube fiber optic cable 100 may additionally comprise a jacket 120.

The cable core 110 generally includes optical fibers 112 that are positioned within buffer tubes 114. In some embodiments, the cable core 110 includes a plurality of optical fibers 112 positioned within one or more buffer tubes 114. The cable core 110 may comprise a plurality of optical fibers 112 positioned within each of the one or more buffer tubes 114. The buffer tubes 114 may each contain one or more optical fibers 12, such as, for example, each buffer tube 114 may contain 6, 8, 10, 12, or even more optical fibers 112. The fiber optic cable 100, may contain more than one buffer tube 114, such as, for example, 2, 4, 6, 8, 10, 12, or even more buffer tubes 114. The fiber optic cable may further comprise a binder material 118 that may secure the components of the cable core 110 together, such as the buffer tubes 114 containing the optical fibers 112 and the strength member 116. For example, the binder material 118 may be a yarn that wraps around the cable core 110. The strength member 116 may comprise a rigid material that may contribute to the strength of the loose-tube fiber optic cable 100.

The cable core 110 may be surrounded by a jacket 120. In such an arrangement, the one or more buffer tubes 114 may be positioned at an interior region of the loose-tube fiber optic cable 100 and the jacket 120 may be positioned around the cable core 110. In one embodiment, the jacket 120 may be disposed as a layer around the one or more optical fibers 212 within buffer tubes 114 of the cable core 110. The jacket 120 may substantially surround the cable core 110. The jacket 120 may comprise an outer surface 122 and an interior surface 124. The interior surface 124 may be in direct contact with the cable core 110. In one embodiment, the interior surface 124 of the jacket 120 may be in direct contact with one or more components of the cable core 110. For example, the jacket 120 may be an extruded polymer that fills the spaces around the buffer tubes 114 and is direct contact with one or more buffer tubes 114. In another embodiment, the jacket 120 may surround the buffer tubes 114 but may not be directly in contact with all of the buffer tubes 114. The outer surface 122 of the jacket 120 may define the outer surface of the loose-tube fiber optic cable 100.

In one embodiment, the jacket 120 may comprise a polyolefin, a polyamide, or combinations thereof. For example, in one embodiment, the jacket 120 may comprise, without limitation, polyethylene, polypropylene, ethylene-propylene copolymers, ethylene-propylene-butylene copolymers, or combinations thereof. Examples of polyethylenes include, without limitation, medium-density polyethylene (MDPE), high-density polyethylene (HDPE), low-density polyethylene (LDPE), and linear low-density polyethylene (LLDPE). Examples of polypropylenes include, without limitation, isotactic polypropylenes, atactic polypropylenes, and syndiotactic polypropylenes. Examples of polyamides include, without limitation, Nylon 12, Nylon 11, Nylon 6, Nylon 6,6, Nylon 6,12, and combinations thereof. As described herein, specific nylon chemical species referred to herein, such as, but not limited to, Nylon 12, Nylon 11, Nylon 6, Nylon 6,6, Nylon 6,12, include the impact modified nylons thereof. For example, as used herein, Nylon 12 refers to both impact modified Nylon 12 and non-impact modified Nylon 12.

Figure 2A:
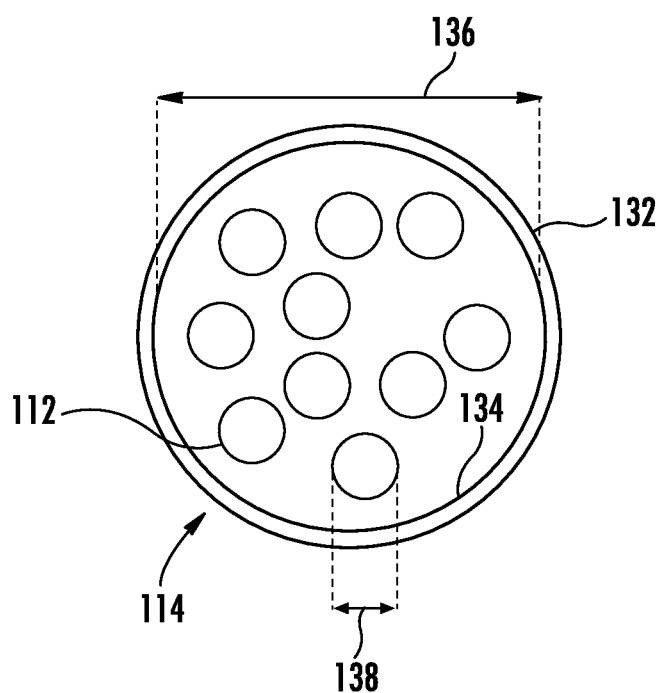
FIG. 2A schematically depicts a cross-sectional view of a buffer tube of a loose-tube fiber optic cable, according to one or more embodiments disclosed herein.

FIG. 2A shows an enlarged view of the buffer tube 114 of FIG. 1 containing a plurality of optical fibers 112. The buffer tube 114 comprises an outer surface 132 and an inner surface 134. The cross sectional shape of the buffer tube 114 may be substantially circular as shown in FIG. 2A, or may be non-circular in other embodiments. The greatest distance between portions of the inner surface 134 may define an inner diameter 136 of the buffer tube 114. The cross sectional shape of the optical fibers 112 may be sufficiently circular, and may have an outer diameter 138. The buffer tube may have an average wall thickness as measured by the average distance between the outer surface 132 and the inner surface 134 of the buffer tube 114. In one embodiment, the inner diameter 136 may be from about 1.2 mm to about 2.0 mm. The wall thickness of the buffer tube 114 may be from about 0.1 mm to about 0.5 mm.

Referring now to FIGS. 1 and 2A, optical fibers 112 are depicted within the cable core 110 in a loose-tube configuration. In such a configuration, the outer diameter 138 of each of the optical fibers 112 may be substantially less than an inner diameter 136 of the buffer tube 114. For example, the ratio of the outer diameter 138 of an optical fiber 112 to the inner diameter 136 of the buffer tube 114 may be less than about 1:2, less than about 1:4, less than about 1:6, less than about 1:8, less than about 1:10, less than about 1:15, or even less than about 1:20.

Figure 2B:
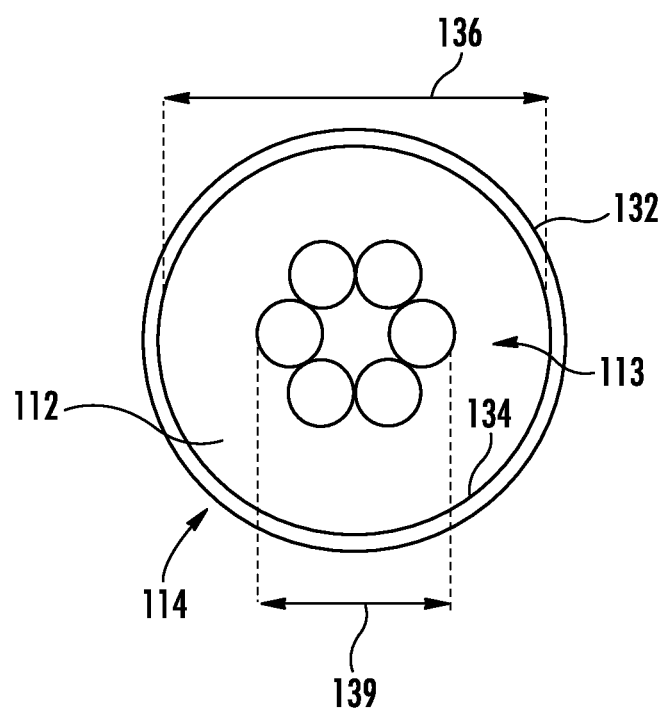
FIG. 2B schematically depicts a cross-sectional view of a buffer tube of a loose-tube fiber optic cable, according to one or more embodiments disclosed herein.

Now referring to FIG. 2B, in another embodiment, the optical fibers 112 may be configured in a stranded pattern. For example, stranded optical fibers are disclosed in U.S. Pat. No. 5,703,983. The optical fiber strand 113 may include a several optical fibers 112 spun around one another. The optical fiber strand 113 has an outer diameter 139 that is less than the inner diameter 136 of the buffer tube 114. For example, the ratio of the outer diameter 138 of an optical fiber strand 113 to the inner diameter 136 of the buffer tube 114 may be less than about 1:1.1, less than about 1:1.2, less than about 1:1.4, less than about 1:1.5, less than about 1:1.8, or even less than about 1:2.

Referring now to FIGS. 1 and 2A, a cable width direction is defined in the axial direction of the fiber optic cable 100, shown as vertical and horizontal directions of FIGS. 1 and 2A. A cable length direction is defined by the direction perpendicular the cable width direction. As used herein, "length" and "width" refer to the cable length and cable width directions as described herein. The various components of the cable core 110, such as the optical fibers 112 and the buffer tube 114 may have different lengths.

As described herein, the buffer tubes 114 may comprise two or more phases having a co-continuous microstructure. In a buffer tube 114 having a co-continuous microstructure, at least a portion of the buffer tube 114 comprises a first phase comprising a first polymer and a second phase comprising a second polymer. The first polymer and the second polymer are different chemical compositions. In one embodiment, first polymer, the second polymer, or both may be homopolymers. In another embodiment, the first polymer, the second polymer, or both may be copolymers. In another embodiment, the first polymer may be a homopolymer and the second polymer may be a copolymer, such as impact polyproylene copolymer containing etheylene and propylene monomers. The first phase and second phase, respectively, may comprise at least about 70%, at least about 80%, at least about 90%, at least about 95%, or even at least about 98% of a polymer composition.

In some embodiments, the microstructure of the co-continuous material is such that the polymer components with individual phases (e.g., each phase of a material having a generally uniform physical state and/or composition) are phase-separated (e.g., phase independent, incompatible, having a miscibility gap, immiscible, co-existing) in a mixture with one another (e.g., two-component mixture). The co-continuous material may be such that one or more of the polymer components forms a continuous network (e.g., web, interconnected system) that branches throughout the co-continuous material, and another of the polymer components fills gaps within that continuous network, and thereby also forms an interconnected network in which the phases of the polymer components remain separated and the networks of the polymer components surround and encapsulate one another on the microscale. In some such embodiments, the individual domains of the polymer components are continuous throughout the co-continuous material and the domains of the polymer components are interlocking with one another in the microstructure and thus joined together. Polymers with phases that may be incompatible with one another include, for example, polypropylene and Nylon. The co-continuous material may combine a first polymer with a second polymer, where the first polymer is flexible and has less material shrinkage at low-temperatures (e.g., sub-zero Celsius) than the second polymer; and the second polymer is stiffer than the first polymer and has greater tensile strength at room-temperatures (e.g., 21° C.) than the first polymer, whereby the co-continuous material may synergistically benefit from the unique attributes of its constituent parts to provide a buffer tube structure that is strong, yet flexible and retains its shape despite temperature extremes, for example.

The buffer tube 114 may comprise two or more polymers that may be disposed in two or more respective phases. For example, three different polymers may form three different phases in the buffer tube 114. In another embodiment, two or more polymer compositions may form a first phase and at least another polymer may form a second phase. In a co-continuous microstructure, the first phase and the second phase may be disposed within the same macroscopic volume as continuous microstructures. If two phases are present in a co-continuous structure, the two phases may substantially form complementary space volumes, such that a first phase fills a portion of a 3D space and the second volume fills the rest of the 3D space not filled by the first phase. A discussion of co-continuous microstructures may be found in "Formation of Co-continuous Structures in Melt-Mixed Immiscible Polymer Blends" by Potschke et al. (Journal of Macromolecular Science, Part C— Polymer Reviews, Vol. C43, No. 1 pp. 87-141, 2003), the teachings of which are incorporated herein by reference.

Co-continuous microstructures may be imperfect, as not all of a phase may be continuous, as it may be broken up and surrounded by the other phase. However, the degree of co-continuity of a bulk substance can be determined and a continuity index ($\Phi_I$) can be determined where $0<\Phi_I \leq 1$, where $\Phi_I=1$ is a perfect co-continuous structure and $\Phi_I=0$ is a non-co-continuous structure. $\Phi_I$ can be determined by an extraction method where a solvent is selected for which the material of the first phase of the co-continuous structure is soluble and for which the material of the second phase of the co-continuous structure is insoluble. For a two phase co-continuous structure, the continuity index can be determined by the equation:

$$\Phi_I = \frac{m_A}{(m_T)(X_A)}$$

where $m_A$ is the mass of the soluble phase that is extracted from the sample, $m_T$ is the total mass of the sample prior to extraction of a soluble phase, and $X_A$ is the mass ratio of the soluble phase to the non-soluble phase of the sample prior to extraction of the soluble phase.

In one embodiment, the buffer tube 114 may comprise a first phase and a second phase disposed in at least a partially co-continuous microstructure. As used herein, a partially co-continuous microstructure refers to a material that has a continuity index ($\Phi_I$) of at least about 0.1. In other embodiments, the buffer tube 114 may have a first phase and second phase where the $\Phi_I$ is greater than or equal to about 0.3, greater than or equal to about 0.4, greater than or equal to about 0.5, greater than or equal to about 0.6, greater than or equal to about 0.7, greater than or equal to about 0.8, or even greater than or equal to about 0.9. As used herein, a "co-continuous structure" or "co-continuous material" refers to a material having at least a partially co-continuous microstructure and does not necessarily mean that the material has a fully co-continuous microstructure.

In one embodiment, only a portion of the buffer tube 114 comprises a first phase and a second phase in a co-continuous microstructure. For example, only the ends or interior region with respect to the length of the buffer tube 114 may have a co-continuous microstructure. In another embodiment, substantially the entire buffer tube 114 comprises a co-continuous microstructure.

The buffer tubes described herein, having at least a portion of co-continuous structure, may have superior strength and flexibility properties as compared with conventional buffer tubes such as conventional impact polypropylene buffer tubes comprising greater than 90% propylene/ethylene copolymer in about a 90/10 ratio and having alpha crystalinity. Furthermore, the buffer tubes described herein may have comparable or superior strength and flexibility properties compared to a conventional multi-layered buffer tube that is a buffer tube comprising more than one layer of polymer material. However, the buffer tubes described herein do not require multiple layer machining techniques to produce, and can instead be extruded as one body shaped as a tube. For example, the co-continuous structured materials which create the multiple phases can be extruded together into a tube shape.

Without being bound by theory, it is believed that the physical characteristics of both phases of the co-continuous microstructure are contributed to the bulk material properties of the buffer tube 114. For example, polyethylene may add flexibility, nylon may add strength and toughness. The buffer tubes may comprise two or more polymer materials that are disposed in respective phases. In various embodiments, the buffer tube may comprise one or more polymers selected from nylon, polypropylene, polyethylene, polybutylene terephthalate, polyethylene terephthalate, polycarbonate, polyethylene oxide, acrylonitrile-butadiene-styrene rubber, polyacrylonitrile, polymethyl methacrylate, polytrimethylene terephthalate, cycloolefinic copolymers, natural or synthetic rubbers, and thermoplastic elastomers. However, the use of other polymer species and classes not stated explicitly herein is contemplated.

In one embodiment, polymer combinations that may make up the multiple phases, respectively, may have differences in their solubility parameter, sometimes called the Hildebrand solubility parameter, of greater than about 1 $(cal/cm^3)^{1/2}$, greater than about 2 $(cal/cm^3)^{1/2}$, greater than about 3 $(cal/cm^3)^{1/2}$, or even greater than about 5 $(cal/cm^3)^{1/2}$. The solubility parameter is defined as the square root of the cohesive energy density of a material which is the amount of energy needed to completely remove unit volume of molecules from their neighbors to infinite separation (an ideal gas). This is equal to the heat of vaporization of the compound divided by its molar volume in the condensed phase. Solubility parameter ($\delta$) can be represented as $$\delta = \sqrt{\frac{\Delta H_v - RT}{V_m}}$$

where $\Delta H_v$ is the heat of vaporization, R is the ideal gas constant, T is temperature, and $V_m$ is the molar volume. The difference in solubility parameters of the polymers may promote phase separation of the polymers which will create the co-continuous microstructure.

The buffer tubes 114 described herein comprising at least partially co-continuous polymeric materials may have good strength properties which may be comparable or superior to conventional alpha phase impact polypropylene buffer tubes. For example, the buffer tubes 114 described herein may acceptable tensile modulus, crush resistance, and/or kink resistance for operability within a fiber optic cable.

Figure 3A:
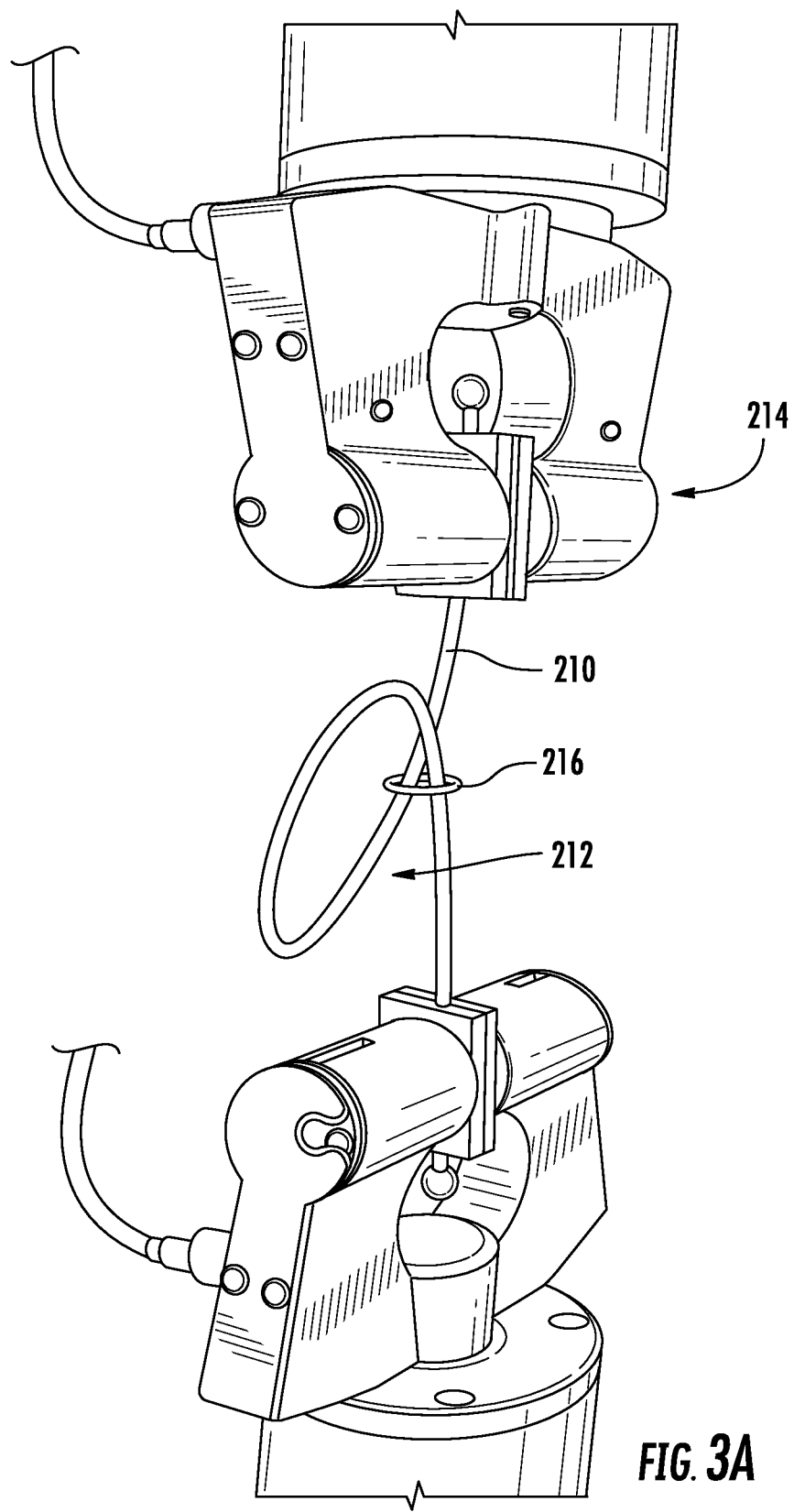
FIGS. 3A and 3B depict a testing apparatus for determining kink resistance of a buffer tube.
Figure 3B:
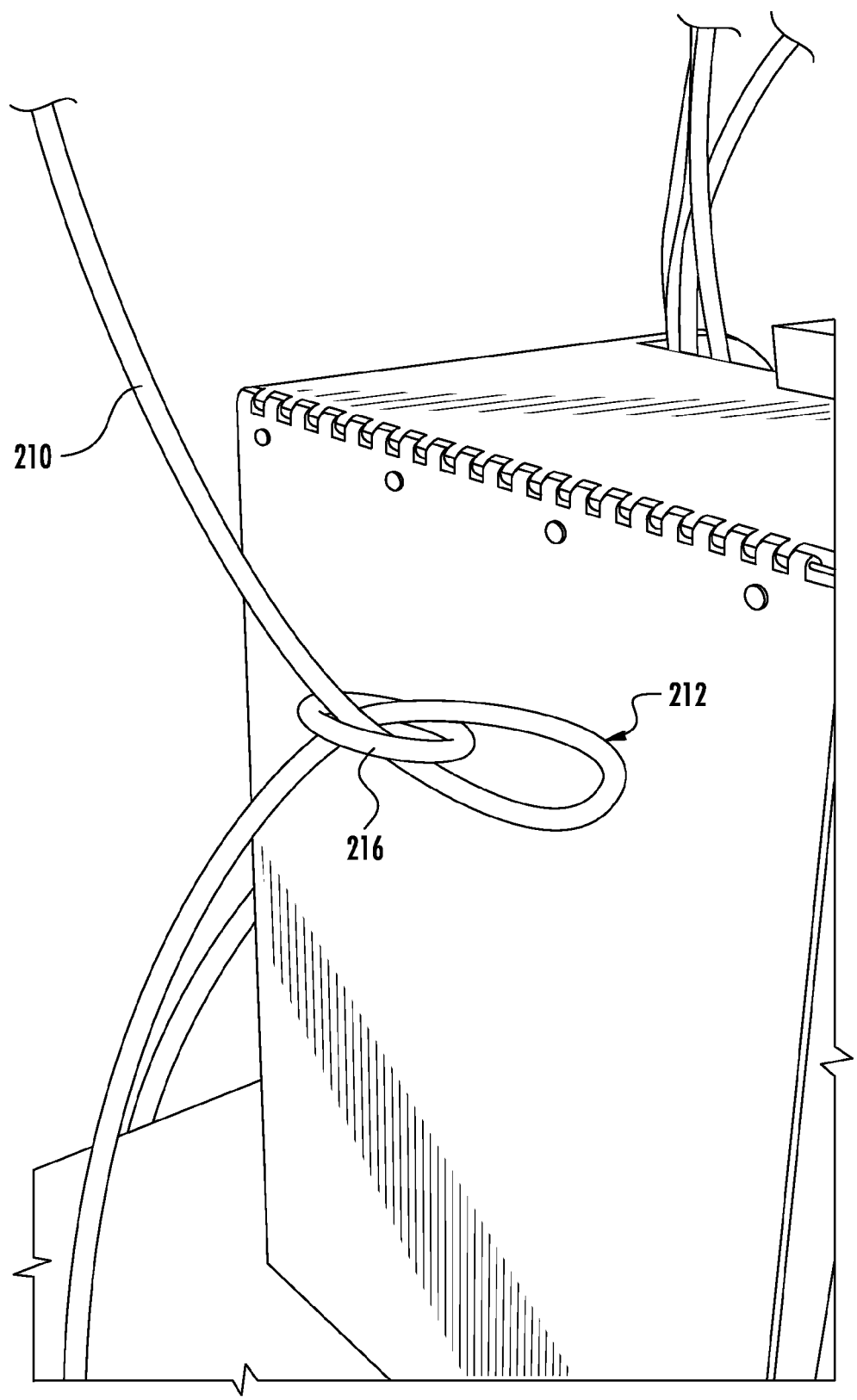

The kink resistance of a buffer tube may be determined by loop testing. Loop testing determines the diameter of a loop and required force at which a particular buffer tube 114 will kink. Referring now to FIGS. 3A and 3B, during a test, a loop 212 with a diameter of 85 mm is formed and placed in the grips 214 of a tensile test machine. A low friction plastic ring 216 at the cross-over point holds the loop 212 in place. The top end of the buffer tube 210 is pulled at a rate of 250 mm per minute, decreasing the diameter of the loop 212 until kinking occurs. As such, the kink resistance is measured as the loop's diameter at kink. Kinking may be determined both by visual observation and by a 10% drop in the force from the peak force required to pull the buffer tube 210. Further, Applicants predict that the kink resistance diameter for buffer tubes disclosed herein will not increase more than 20% after 30 days aging at 85 degrees Centigrade and 85% relative humidity. Kink testing is performed without the optical fibers present.

The modulus of elasticity of a buffer tube may be determined by any conventional test for modulus of elasticity (i.e., Young's modulus, secant modulus, flexural modulus, tensile modulus).

The crush resistance of a buffer tube 114 may be determined by a crush test with a sample of the buffer tube that is 6 millimeters in length. The sample is placed between an upper movable plate and a lower stationary plate to receive a lateral compressive load perpendicular to the longitudinal axis of the tube. The load is applied by the tensile test machine at a speed of 6 millimeters per minute until the buffer tube is compressed to 50% of the original diameter. The crush loads at crush of 5% of the original diameter and at 25% of the original diameter due to tube compressive strain are recorded. For buffer tubes 114 disclosed herein, Applicants predict a crush load at 25% compression to be at least 20 N, such as at least 25 N, at least 30 N, and even at least 40 N is contemplated in at least some embodiments, such as those with larger tube dimensions. Further, Applicants predict that the magnitude of crush load required to achieve 25% compression of the buffer tube 114 will not decrease more than 20% after 30 days aging at 85 Centigrade and 85% relative humidity. Crush testing is performed without optical fibers in the buffer tubes.

In one embodiment, the buffer tube 114 may have a modulus of elasticity of greater than or equal to about 1600 MPa. In other embodiments, the buffer tube 114 may have a modulus of elasticity of greater than or equal to about 1800 MPa, greater than or equal to about 2000 MPa, or even greater than or equal to about 2400 MPa. By comparison, some conventional alpha phase impact polypropylene buffer tubes—may have a modulus of elasticity of less than or equal to about 1200 MPa.

In one embodiment, the buffer tube 114 may have a crush resistance of greater than or equal to about 20 N. In other embodiments, the buffer tube 114 may have a crush resistance of greater than or equal to about 22 N, greater than or equal to about 24 N, greater than or equal to about 26 N, or even greater than or equal to about 30 N. By comparison, some conventional multi-layered buffer tubes may have a crush resistance of less than or equal to about 18 N and some conventional alpha phase impact polypropylene buffer tubes may have a crush resistance of less than or equal to about 18 N.

In one embodiment, the buffer tube 114 may maintain a kink resistance diameter equal to or less than the kink resistance of a conventional multi-layer tube having the same materials (layered instead of co-continuously arranged) and a single layered buffer tube made only of the lesser performing of the two polymers may have a greater kink resistance diameter. In one embodiments, the buffer tube 114 may have a kink diameter of less than or equal to about 30 mm, less than or equal to about 28 mm, less than or equal to about 26 mm, or even less than or equal to about 20 mm. By comparison, a conventional polybutylene terephthalate (PBT) or polybutylene terephthalate/polycarbonate buffer tube may have a kink resistance of greater than or equal to about 30 mm.

The buffer tubes 114 described herein may have a coefficient of thermal expansion ("CTE") lower than that predicted by the weighted average of the CTE of each material of the co-continuous structure. For example, using a weighted average to predict CTE, A first component of the buffer tube 114 may have a coefficient of expansion of equal to about $100 \times 10^{-6}/°$ C., and a second component may have a coefficient of thermal expansion of $200 \times 10^{-6}/°$ C. The weighted average would predict that a 50:50 mixture of the two materials would have a coefficient of thermal expansion of about $150 \times 10^{-6}/°$ C. However, a co-continuous mixture of these two materials at a 50:50 ratio may exhibit a coefficient of thermal expansion lower than that predicted by the weighted average. Without being bound by theory, it is believed that the lower CTE may be a result of the restrictive of interaction by the phase with less expansion on the phase with greater expansion. In one embodiment, the coefficient of thermal expansion of the buffer tube 114 may be less than or equal to about $200 \times 10^{-6}/°$ C. at 20° C., less than or equal to about $150 \times 10^{-6}/°$ C. at 20° C., or even less than or equal to about $100 \times 10^{-6}/°$ C. at 20° C.

It will be apparent to those skilled in the art that various modifications and variations can be made without departing from the spirit or scope of the disclosed embodiments. Modifications combinations, sub-combinations and variations of the disclosed embodiments incorporating the spirit and substance of the disclosed embodiments may occur to persons skilled in the art.

What is claimed is:

1. A loose-tube fiber optic cable comprising a cable core and a jacket, the cable core comprising a buffer tube and an optical fiber, wherein:
   the optical fiber is positioned within the buffer tube;
   the buffer tube is positioned at an interior region of the loose-tube fiber optic cable;
   the jacket is positioned around the cable core; and
   at least a portion of the buffer tube comprises a first phase comprising a first polymer and a second phase comprising a second polymer, the first polymer and the second polymer are different chemical compositions, and the first phase and the second phase are disposed in at least a partially co-continuous microstructure;
   wherein at least a portion of the buffer tube has a continuity index ($\Phi_I$) of greater than or equal to 0.1.

2. The loose-tube fiber optic cable of claim 1, wherein substantially the entire buffer tube comprises a co-continuous microstructure.

3. The loose-tube fiber optic cable of claim 1, wherein a coefficient of thermal expansion of the buffer tube is less than or equal to about $200 \times 10^{-6}/°$ C. at 20° C.

4. The loose-tube fiber optic cable of claim 1, wherein the first polymer and the second polymer are selected from olefins, amides, esters, carbonates, styrenics, methacrylates, etherimides, ether-ethers, sulfines, phenylene oxides, phenylene sulfides, cycloolefinic copolymers, liquid crystalline polymers, urethanes, and rubbers, respectively.

5. The loose-tube fiber optic cable of claim 1, wherein the difference between a solubility parameter of the first polymer and a solubility parameter the second polymer is greater or equal to about 1 $(cal/cm^3)^{1/2}$.

6. The loose-tube fiber optic cable of claim 1, wherein the cable core comprises a plurality of optical fibers positioned within the buffer tube.

7. The loose-tube fiber optic cable of claim 1, wherein substantially the entire buffer tube comprises the first phase comprising the first polymer and the second phase comprising the second polymer.

8. The loose-tube fiber optic cable of claim 1, wherein the cable core comprises a plurality of buffer tubes and a plurality of optical fibers positioned within each of the buffer tubes.

9. The loose-tube fiber optic cable of claim 1, wherein the buffer tube has a modulus of elasticity of greater than or equal to about 1600 MPa.

10. The loose-tube fiber optic cable of claim 1, wherein the buffer tube has a crush resistance of greater than or equal to about 18 N.

11. The loose-tube fiber optic cable of claim 1, wherein the buffer tube has a kink resistance diameter of less than or equal to about 30 mm.

12. The loose-tube fiber optic cable of claim 1, wherein the buffer tube has an average wall thickness of less than or equal to about 0.4 mm.

13. The loose-tube fiber optic cable of claim 1, wherein at least a portion of the buffer tube has a continuity index ($\Phi_I$) of greater than or equal to about 0.3.

14. The loose-tube fiber optic cable of claim 1, wherein at least a portion of the buffer tube has a continuity index ($\Phi_I$) of greater than or equal to about 0.5.

15. The loose-tube fiber optic cable of claim 1, wherein at least a portion of the buffer tube has a continuity index ($\Phi_I$) of greater than or equal to about 0.7.

16. The loose-tube fiber optic cable of claim 1, wherein the first polymer is a copolymer comprising propylene and ethylene.

17. A loose-tube fiber optic cable comprising a cable core and a jacket, the cable core comprising a buffer tube and an optical fiber, wherein:

the optical fiber is positioned within the buffer tube;

the buffer tube is positioned at an interior region of the loose-tube fiber optic cable;

the jacket is positioned around the cable core, the jacket defining an outer surface of the loose-tube fiber optic cable;

an outer diameter of the optical fiber is substantially less than an inner diameter of the buffer tube;

at least a portion of the buffer tube comprises a first phase comprising at least about 70% of a first polymer and a second phase comprising at least about 70% of a second polymer, the first polymer and the second polymer are different chemical compositions, and the first phase and the second phase are disposed in at least a partially co-continuous microstructure; and at least a portion of the buffer tube has a continuity index ($\Phi_I$) of greater than or equal to 0.5.

18. The loose-tube fiber optic cable of claim 17, wherein at least a portion of the buffer tube has a continuity index ($\Phi_I$) of greater than or equal to about 0.7.

19. A loose-tube fiber optic cable comprising a cable core and a jacket, the cable core comprising a buffer tube and an optical fiber, wherein:

the optical fiber is positioned within the buffer tube;

the buffer tube is positioned at an interior region of the loose-tube fiber optic cable;

the jacket is positioned around the cable core, the jacket defining an outer surface of the loose-tube fiber optic cable;

an outer diameter of the optical fiber is substantially less than an inner diameter of the buffer tube;

substantially the entire buffer tube comprises a first phase comprising at least about 70% of a first polymer and a second phase comprising at least about 70% of a second polymer, the first polymer and the second polymer are different chemical compositions, and the first phase and the second phase are disposed in at least a partially co-continuous microstructure;

wherein at least a portion of the buffer tube has a continuity index ($\Phi_I$) of greater than or equal to 0.1.

20. The loose-tube fiber optic cable of claim 19, wherein substantially the entire buffer tube has a continuity index ($\Phi_I$) of greater than or equal to about 0.5.

* * * * *